J. W. MARTIN.
Damper.
No. 42,049.                                           Patented March 22, 1864.
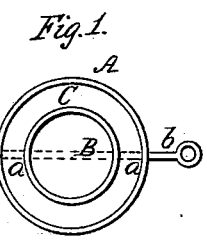
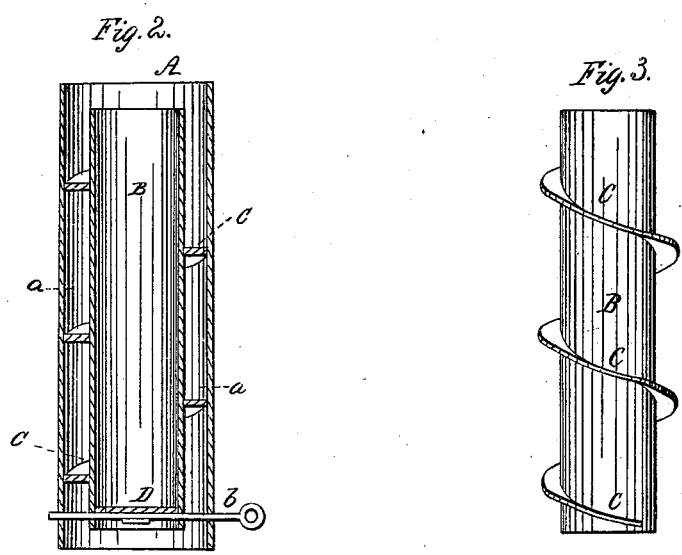

UNITED STATES PATENT OFFICE.

JOHN W. MARTIN, OF MILTON, MASSACHUSETTS, ASSIGNOR TO HIMSELF AND JONATHAN A. MARTIN, OF SAME PLACE.

IMPROVEMENT IN DAMPERS.

Specification forming part of Letters Patent No. 42,049, dated March 22, 1864.

*To all whom it may concern:*

Be it known that I, JOHN W. MARTIN, a resident of Milton, in the county of Norfolk and State of Massachusetts, have invented an Improved Draft-Regulator of Stove-Pipes or Flues; and I do hereby declare the same to be fully described in the following specification and represented in the accompanying drawings, of which—

Figure 1 denotes a top view, and Fig. 2 a longitudinal section, of a stove-pipe with my invention applied to it. Fig. 3 is a side view of the draft-regulator as it appears when removed from the smoke-flue.

The nature of my invention is a combination, consisting, not only of a pipe and a damper placed within such pipe, but a helix-guide or screw arranged about the outer surface of such pipe and extending from it to the internal surface of the smoke-flue.

In the drawings, A denotes a smoke-pipe, having within it a shorter pipe, B, which is arranged axially in the said smoke-pipe A, and so that there shall be an annular smoke-space, a, between the two and entirely around the outer surface of the internal pipe. Within the said space a, and extending across it, there is a helical partition, C, which goes from end to end of the pipe B or forms a screw about the same, in order that smoke, while it may be ascending or flowing through the space a, may be caused to pass several times around the pipe B and against the inner surface of that part of the pipe A which immediately surrounds the said pipe B. A damper, D, is arranged within the pipe B, the shaft or spindle b of the damper being carried crosswise through both pipes A and B. On closing this damper more or less, the smoke, or much of it, instead of flowing directly through the pipe B, will be caused to course through the space a and around the pipe B; but when the damper is open most, if not all, the smoke will escape through the said pipe B. The helix or screw partition serves to retard the smoke and to impart to it a helical or rotary movement (more or less) over the upper end of the pipe B. The retardation of the smoke, or, in other words, the screw-partition suffices to arrest sparks or cinders and cause them to fall back into the smoke-pipe, particularly when the draft may be strong. Furthermore, the screw disseminates the heat and smoke evenly around the smoke-pipe, and thus not only prevents the soot from gathering unequally on its inner surface, but facilitates equality of radiation of heat from such pipe.

The whole apparatus answers an excellent purpose as a means of regulating the draft through the smoke pipe.

I claim—

The improved draft-regulator, consisting of the pipe B, the damper D, and the screw or helical partition C, as arranged together and within a smoke-pipe, substantially as described.

JOHN W. MARTIN.

Witnesses:
DANIEL MAHONEY,
J. D. BRADLEE.